Oct. 27, 1959                D. W. MacKIERNAN                2,910,692
                    CLUTTER-OPERATED ANTI-CLUTTER CIRCUIT
                           Filed March 23, 1953
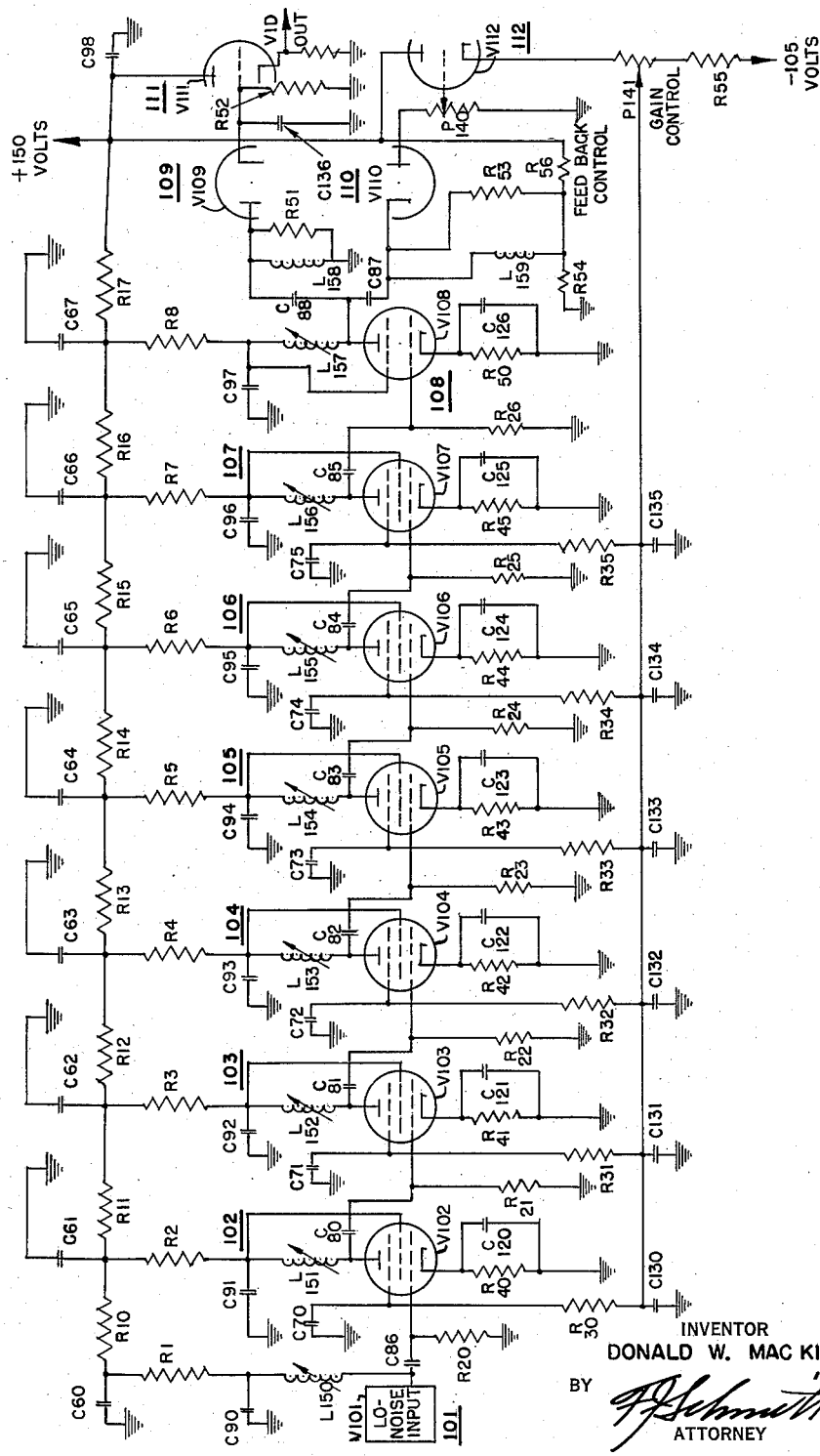
INVENTOR
DONALD W. MAC KIERNAN
BY
ATTORNEY

United States Patent Office 2,910,692
Patented Oct. 27, 1959

2,910,692

CLUTTER-OPERATED ANTI-CLUTTER CIRCUIT

Donald W. MacKiernan, Willow Grove, Pa.

Application March 23, 1953, Serial No. 344,250

2 Claims. (Cl. 343—17.1)

(Granted under Title 35, U.S. Code (1952), sec. 266)

The invention described herein may be manufactured and used by or for the Government of the United States of America for governmental purposes without the payment of any royalties thereon or therefor.

The invention relates to a clutter-operated anti-clutter circuit for development of a radar receiver with improved anti-clutter properties.

A basic problem in the operation of radar receivers is that of discrimination against clutter, i.e., sea or/and ground return, which in the past has interfered with detection of military targets. Various methods for discriminating against clutter have been proposed and used. Techniques of controlling gain by means of clutter level have in the past been recognized, however, the previous techniques had the disability of not acting fast enough and stabilization could not be achieved in attempting to control more than a one stage feed back loop. A logarithmic receiver has been used in order that the receiver be automatically non-limiting. However, this had the disadvantage of target shrinkage causing some loss of target in operational use. The logarithmic receiver had the further disadvantages of being difficult to manufacture and in operation unexpected shortcomings of the apparatus were discovered. The instant invention therefore presents a radar receiver incorporating clutter-operated anti-clutter (COAC) circuitry. This receiver meets the requirements for controlling gain by clutter level and in addition, is the first automatic non-limiting device which is suitable for use in stagger-tuned or double-tuned IF strips, which are used in wide-band high-definition radar receivers.

It is well known that the signals entering a radar receiver may range from one to two micro volts for a small distant target to several hundred thousand micro volts for nearby targets and clutter. Since no linear receiving system can resolve more than about a 6 to 1 input range (between the minimum visible input and saturation as presented on the screen of a cathode ray oscilloscope), steps must be taken to preserve the incremental gain of the receiver and thus to extend its useful range.

These steps are commonly known under the general term of "anti-clutter circuits." More common controls which have been used include detector back bias, instantaneous automatic gain control (1-stage loop), and sensitivity time control. Operational experience with these circuits has shown that, although they are useful their range is limited and operator skill is the dominant factor in their effective use. As hereinbefore stated another widely used anti-clutter device is the logarithmic receiver, which has no range limitation and is automatic. However, this had the disadvantage of target shrinking and the receiver was not popular with operators. In addition, some loss of target in operational use has been caused. The present receiver which is a linear receiver whose gain is set automatically by the instantaneous clutter signal to a value proportional to the logarithm of the clutter signal divided by the clutter signal has been developed as the best receiver for a high-power radar. The most significant attribute of this receiver is its dynamic capability to present target echoes which otherwise would be undetected because of receiver saturation due to clutter. Thus, incremental gain of the receiver is preserved. This receiver meets the requirements of operational experience and intuitive reasoning which takes into consideration the extreme variation of signal amplitude and the possibility of eliminating disadvantages of the other known systems. The instant invention in obviating the noted prior art deficiencies employs a fast acting feedback bias, which is developed from radar video signals which include clutter components, and is supplied to the respective stages of an intermediate frequency (I.-F.) amplifier. The feedback bias in the instant invention is a composite voltage consisting of essentially a video voltage superposed onto a quiescent preselected level of D.C. voltage. The higher frequency components of this feedback bias are removed by the action of an extremely short time constant filter, which also serves to introduce a finite amount of predetermined delay. Due to the short time constant of the filter in the instant invention, the video character of the feedback bias is thereby essentially retained. Thus, in this manner, a radar receiver augmented by the clutter-operated anti-clutter circuit of the instant invention possesses enhanced target receiving capability in the presence of clutter signals.

Accordingly, an important purpose of this device is to improve the operation of a radar receiver in regard to its ability to discriminate against clutter.

A further aim is to develop a linear radar receiver including a clutter-operated anti-clutter circuit for preserving the incremental gain of the receiver during intervals in which clutter signals occur to preclude saturation of radar video signals during such intervals.

Another purpose of the invention is to provide fast acting circuitry wherein stabilization is obtained and more than one stage is controlled by application of feedback bias.

Still another object of the invention is to provide a radar receiver which operates linearly except during intervals in which clutter signal occurs at which time the receiver gain is automatically set by the instantaneous clutter signal at a value proportional to the log of the clutter signal divided by the clutter signal.

Other objects of the present invention are to develop clutter-operated anti-clutter circuitry which will have faster control, be equally applicable to narrow or wide band amplifiers, and which will have a greater dynamic range of control.

Other objects and many of the attendant advantages of this invention will be readily appreciated as the same becomes better understood by reference to the following detailed description when considered in connection with the accompanying drawing wherein:

A schematic diagram of important circuits of the clutter-operated anti-clutter receiver showing the anti-clutter control means is illustrated.

Referring to the drawing, a low-noise input stage 101 comprising a conventional tube element V101, precedes six synchronous single-tuned I-F stages, 102, 103, 104, 105, 106 and 107, respectively. The term synchronous single-tuned herein used means that the I-F stages are all tuned to the same I-F frequency, in contrast to staggered tune stages which are tuned to different I-F frequencies. Following the six synchronous single-tuned stages is a final stage 108. The final stage delivers signals to two detector stages, one of which is a normal video output detector 109 and the other a negative output detector 110, which drives a cathode follower 112. The cathode follower 112 through suitable resistance-capacitance (RC) filtering, controls the voltage of the suppressor grids of pentodes V102, V103, V104, V105, V106, and V107, of the six synchronous single-tuned stages, respectively. Two potentiometer controls P140 and P141 are provided to insure proper anti-clutter operation. The other detector stage 109, drives a video cathode follower 111, comprising triode V111. Detector 110 impresses signals on the cathode follower 112 and has a potentiometer P140, in the plate circuit, one end of the potentiometer being connected to ground and the other end being connected directly to the plate of diode V110. The contact arm of potentiometer P140 is connected directly to the control grid of cathode follower V112. This potentiometer, therefore, acts as a feedback bias control, enabling signals of appropirate amplitude to be impressed on the grid input of triode V112. The normal setting for this control would be that which allows the output from a continuous signal 80 db above noise to exceed the noise output by a factor of 2 to 1. The cathode circuit of the cathode follower V112 has a gain control potentiometer P141, in series with one end of a resistor R55, the other end of the resistor being connected to a negative 105 voltage source. The gain control potentiometer P141 has its contact arm connected through low resistors of the order of 1000 ohms to the suppressor grids of the synchronous stages, the suppressor grids are isolated from ground with respect to D.C. by means of 500 micromicrofared ($\mu\mu f.$) capacitors. Since in the instant invention the application of the feedback bias developed from radar video signals including clutter is delayed in time according to the radar pulse width, the RC time constant associated with the particular values noted above is fundamental in achieving circuit stability, i.e., prevent oscillation. A plurality of radio frequency bypass capacitors C130, C131, C132, C133, C134 and C135 are provided. Since the value of each of these capacitors is 50 $\mu\mu f.$, they do not significantly enter into determining the time constant of the filtering networks. These capacitors also facilitate mechanical support of the feedback line components. The cathode circuit of detector 110 includes inductor L159 and resistor R53 in parallel, which in addition to functioning as a low Q resonant load for the RF signal, provide a D.C. path for the application of a clamping voltage to the cathode of diode V110. At the ends of resistor R53 and inductor L159 opposite the ends leading to the cathode of stage V110 is tied one end of a low value resistor, R54, the other end of resistor R54 being connected to ground. To the junction of resistor R54, inductor L159 and resistor R53, is joined one end of resistor R56. The other end of resistor R56 is joined to the 150 volt positive plate supply voltage source. Thus, it will be apparent that the cathode of diode V110 is clamped at some positive potential by virtue of a voltage division performed by the combination of R54 and R56, whose respective values in the instant invention are chosen to provide a clamping voltage of appproximately six volts at the cathode of diode V110. This clamping circuit, therefore, obviates the development of a feedback bias voltage due to normal receiver noise, as well as target and clutter signals of less than a predetermined amplitude, during normal operation of the receiver. The full sensitivity of the receiver is thus retained for signals having relatively low amplitude levels.

By means of the low RC time constants in the feedback loop due to low resistance and capacitance values (1000 ohms and 500 $\mu\mu f.$) high speed clutter-operated anti-clutter action results. The follow time is made approximately equal to transmitter pulse duration. Experimentally it has been determined that circuit stability follows when the time constant of the feedback net is equal to or greater than the effective time constant of the IF strip. By means of suppressor control, the feedback loop is effectively isolated from the intermediate frequency (IF) signal path. The feedback bias supplied to the suppressor does not appreciably affect the bandwidth of the tuned circuits because of the negligible capacity change from the Miller effect with change in gain. Thus, this circuit may be used in stagger or double-tuned as well as in synchronous single-tuned circuits. In operation there appears about plus two volts at the contact point of the gain control potentiometer P141 which is set for that voltage. In the presence of a signal accompanied by a relatively large amount of land or sea-clutter, the clutter signal, modified by the action of the short time constant filter, is fed back to the suppressor grids of the first six intermediate frequency stages thereby attenuating clutter level so that the lower portion of the clutter return is greatly reduced. In that manner the signal to clutter ratio is enlarged and a target pip slightly larger than the clutter signal may be more readily detected. For example, a signal accompanied by clutter, being fed onto the grid of the first intermediate frequency stage, is amplified throughout the intermediate frequency stages and the amplified output from the seventh intermediate frequency stage is fed to diodes V109 and V110 of the respective detector stages shown in the illustrative embodiment. The output signal appearing at the anode of diode V109 is demodulated and is fed to the video output stage 111, in the cathode circuit of which may be obtained a low impedance video signal for normal presentation as is understood. Simultaneously, output is taken off the other section V110 of the twin diode and developed across the feedback control in its output circuit to drive the cathode follower 112. The signal thus appearing at the gain control constitutes a feedback bias voltage which is filtered to remove the RF component and supplied to the suppressor grids of the prior intermediate frequency stages and being a negative signal, the feedback bias thus developed reduces the clutter signal. Due to the very fast response time as a result of the low RC modulating feedback path (1000 ohms and 500 $\mu\mu f.$), high speed clutter-operated anti-clutter action results. The feedback time is of the order of the transmitter pulse width. In other words, for reason of circuit stability, the delay in application of this feedback bias the follow time is made approximately equal to transmitter pulse duration for the system contemplated, or what is tantamount to the same thing, the reciprocal of the receiver bandwidth. Thus, it is seen that a large clutter signal serves to attenuate itself so that the video output shows a reduced clutter level on the top of which a small target signal may be more readily detected. Therefore, in the presence of clutter it is possible to resolve input radar signals many times the normal six to one input range of the normal indicating system. The anti-clutter circuit prevents saturation and consequently effectively reduces the effects of jamming by any method other than pulse jamming.

A table of suggested values for the various components appears in this specification. This table is shown merely by way of example for one particular type of radar equipment in which it has been incorporated with very satisfactory results. The system may be incorporated in other electronic equipment and modifications will readily occur to one skilled in the art without departing from the inventive teaching herein. The values and tube designations are given merely by way of example as having been shown satisfactory in operation of one receiver incorporating the instant inventive features.

SUMMARY

Thus to briefly summarize the illustrative showing in the drawing, following the low-noise input stage, the synchronous single-tuned stages and the final stage, is a twin diode, half of which acts as a video output detector. The video output detector drives one half of a twin triode which acts as a video output tube. The other one half of the twin diode has a potentiometer in the plate circuit. The tap of this potentiometer is directly connected to the grid of a second triode of the twin triode tube which is driven by the signal developed across the potentiometer. The potentiometer acts as a feedback control. The cathode circuit of the cathode follower has a gain control potentiometer in series with a voltage dropping resistor which is connected to a negative 105 voltage source. The gain control potentiometer is connected throug low resistance of the order of 1000 ohms to the suppressor grids of the intermediate frequency stages. The suppressor grids are isolated from ground with respect to D.C. by means of 500 $\mu\mu f.$ capacitors. The low resistance and capacitances (1000 ohms and 500 $\mu\mu f.$) cause high speed clutter-operated anti-clutter action. The follow time is made approximately equal to transmitter pulse duration. This criterion is fundamental in achieving circuit stability. By means of suppressor control the feedback loop is effectively isolated from the intermediate frequency signal path and the feedback bias supplied to the suppressor does not appreciably affect the band width of the tuned circuits because of the negligible capacity change from the Miller effect with change of gain. Therefore, a circuit with faster control, and that is equally applicable to narrow or wide band amplifiers as well as permitting a greater dynamic range of control results.

As hereinbefore described two potentiometer controls are provided to insure proper anti-clutter operation. The first is a gain set which controls the no-signal suppressor voltage. In practice, this would be adjusted to give the correct noise level for the particular indicating system. The second potentiometer is a depth-of-drive control (feedback control) which adjusts the amount of clutter signal fed back for COAC operation. The normal setting would be that which allows the output from a continuous signal 80 decibels (db) above noise to exceed the noise output by a factor of roughly 2 to 1. The COAC detector is biased so that receiver noise is not fed back.

The unique features of the receiver of the present invention due to the circuitry described are as follows:

First, operation of COAC over a one hundred db range of input signal, is made possible by the use of equal control on many stages.

Secondly, high-speed COAC action (follow time is about equal to pulse duration) is made possible. Experiments have shown that the circuit is stable when the time constant of the feedback net is equal to or greater than the effective time constant of the IF strip. The use of suppressor control effectively isolates the feedback loop from the IF signal path.

Third, change of gain by feedback to suppressor does not appreciably effect the Q of the tuned circuits as is the case in the non-linear damping element type of logarithmic receiver. It must be noted also that capacity change from Miller effect is extremely small. Thus, the circuit is usuable in stagger or double-tuned as well as in synchronous tuned circuits.

MATHEMATICAL DEVELOPMENT

The following list of symbols is given for ease of following the mathematical development.

Symbol: List of symbols
$e_c$ ------- Clutter signal (voltage units).
$e_t$ ------- Target signal (voltage units).
$e_s$ ------- Resulting signal of target and clutter.
$E_C$ ------- Video voltage due to $e_c$.
$E_S$ ------- Video voltage due to $e_s$.
$V$ ------- $E_s - E_c$ (video target differential voltage).
$G$ ------- Over-all gain of receiver.
$E_{sup}$ ----- Absolute voltage on suppressor grid.

When a series of intermediate stages such as the 6AS6 stages recommended in use of the instant invention are cascaded, it can be shown graphically that the overall gain follows very closely the mathematical relationship, $$G \sim E_{sup}e - E_{sup} \quad (1)$$

Since $E_{sup}$ in the COAC receiver is proportional to $E_c$, and $$G = \frac{E_c}{e_c}$$

it follows that $$E_c \sim 1ne_c \quad (2)$$

By normalizing and introducing arbitrary constants to form equations which, when plotted, give curves similar to those obtained with actual receivers, it is possible to write $$E_c = 1 + \log. e_c \quad (3)$$

as the output-input equation for the COAC receiver when operating in the presence of a clutter signal.

RESPONSE TO A TARGET SIGNAL

The return from a desired target will be of a time duration corresponding to the pulse length. Since COAC action is delayed by approximately the same time, the target signal will be amplified linearly and in accordance with the gain as set by the immediately preceding clutter level.

Since the gain of the receiver is defined as output voltage divided by input voltage, it can be seen from Equation 3 that $$G = \frac{1 + \log. e_c}{e_c} \quad (4)$$

and $$E_s = \frac{(1 + \log. e_c)}{e_c} e_s \quad (5)$$

To a radar operator, the important thing is the difference voltage between the signal and clutter voltage as seen, for example, through a fast time-constant circuit. Subtracting Equation 3 from Equation 5 gives $$V = (1 + \log. e_c)\left(\frac{e_s}{e_c} - 1\right) \quad (6)$$

The symbol $e_s$ as used above represents the combined signal of target return and clutter return, where $$e_s + \sqrt{e_c^2 + e_t^2} \quad (7)$$

is assumed. Because of the random phase distribution of clutter, the power-type addition is used instead of linear addition; it is believed to be a closer approximation of the actual situation.

From Equations 6 and 7

$$V_{COAC} = (1 + \log. e_c)\left[\frac{(e_c^2 + e_t^2)^{1/2}}{e_c}\right] - 1 \quad (8)$$

A similar derivation for a logarithmic receiver will yield $$V_{\log.} = \log. \frac{(e_c^2 + e_t^2)^{1/2}}{e_c} \quad (9)$$

Comparing Equations 8 and 9 will give the measure of improvement of the instant COAC receiver over a logarithmic receiver. Although in the absence of clutter or in the presence of very small signals the response of the logarithmic receiver is essentially linear and the response of the two receivers is approximately the same, for increasingly larger target signals the COAC receiver will give an increasingly brighter response on the indicator, which leads to an improvement in operator efficiency.

In the presence of clutter the COAC receiver gives an increasingly greater target-to-clutter difference, thereby enhacing the possibility of target detection and simplifying and aiding target tracking.

It will readily be apparent that the circuitry shown is merely an illustrative embodiment of the subject invention, and that variations thereof will readily occur to one skilled in the art. For example, other circuitry may be used, the feedback system may be used in other types of radar sets or may be used in applications other than radar. Variations in individual components are within the purview of the invention. It is considered within the scope of this invention to modify and change the constants of the feedback loop to any or all of the various stages. Additional stages may be omitted or added without departing from the invention. Application to uses other than detection of military targets may be made. The use and embodiment of the specific method and apparatus are shown merely by way of example.

*Table of suggested values of components*

| Components | Value, Unit |
| --- | --- |
| R1, R2, R3, R4, R5, R6, R7, R8 | 2.7K ohms. |
| R10, R11, R12, R13, R14, R15, R16, R17 | 47 ohms. |
| R20, R21, R22, R23, R24, R25, R26 | 2K ohms. |
| R30, R31, R32, R33, R34, R35 | 1K ohms. |
| R40, R41, R42, R43, R44, R45 | 220 ohms. |
| R50 | 180 ohms. |
| R51, R52, R53 | 3.9K ohms. |
| R54 | 820 ohms. |
| R55, R56 | 20K ohms. |
| C60, C61, C62, C63, C64, C65, C66, C67 | 500µµ farad. |
| C70, C71, C72, C73, C74, C75 | 500µµ farad. |
| C80, C81, C82, C83, C84, C85, C86, C87, C88 | 500µµ farad. |
| C90, C91, C92, C93, C94, C95, C96, C97, C98 | .001µ farad. |
| C120, C121, C122, C123, C124, C125, C126 | .001µ farad. |
| C130, C131, C132, C133, C134, C135 | 50µ farad. |
| C136 | 10µµ farad. |
| P140 | 10K ohms, variable. |
| P141 | 2K ohms, variable. |
| L150, L151, L152, L153, L154, L155, L156, L157 | Variable henries (IF). |
| L158, L159 | 30MC, SR. |
| V101 | 6J4. |
| V102, V103, V104, V105, V106, V107 | 6AS5. |
| V108 | 6AK5. |
| V109, V110 | ½ 6AL5. |
| V111, V112 | ½ 12AT7. |

LEGEND

R=resistor; C=capacitor; L=coil or inductor; P=potentiometer; V=tube; SR=self resonant; 1K=1000; µ=micro, µµ=micro micro, F=farad.
(6J4, 6AS5, 6AK5, 6AL5, 12AT7 refer to tube designations.)

I claim:
1. In a radar system having a transmitter for repetitively producing pulsed emissions and a receiver including an intermediate frequency amplifier having a plurality of cascaded amplifier stages, the combination with said intermediate frequency amplifier of a clutter-operated anti-clutter circuit operable in the presence of clutter signal to automatically render said amplifier dynamically capable of reception over a range of the order of 100 db, said circuit comprising detector means including potential biasing means responsive to said intermediate frequency amplifier to effect rectification of intermediate frequency output signals above a predetermined amplitude level to produce radar video signals including clutter, cathode follower means responsive to the detector means to supply the radar video signals including clutter at a low impedance level, a corresponding plurality of relatively short time constant capacitive-resistive filtering means each connected in the input to the cathode follower means to develop a feedback bias delayed in time with respect to said radar video signals by an amount substantially equal to the duration of the pulsed emissions, each of said filtering means being electrically connected in the output to the respective amplifier stages to supply thereto said feedback bias to control amplifier gain during an interval in which clutter signal is present, thereby preserving the incremental gain of the amplifier and precluding saturation of radar video signals.

2. In a radar system having a transmitter for repetitively producing pulsed emissions and a receiver including an intermediate frequency amplifier having a plurality of cascaded pentode amplifier stages, the combination with said intermediate frequency amplifiers of a clutter-operated anti-clutter circuit operable in the presence of the clutter signal to automatically render said amplifier dynamically capable of reception over a range of the order of 100 db, divided by the clutter signal, said circuit comprising a voltage divider means operable to provide a predetermined potential level, diode detector means connected in the input to said voltage divider means to be maintained at the predetermined potential level and coupled to the output of said intermediate frequency amplifier to receive intermediate frequency output signals, said diode detector having a substantially resistive load for developing rectified radar video signals including clutter from said intermediate frequency output signals which are above the predetermined potential level, a cathode follower including a substantially resistive cathode load impedance in the output thereof responsive to said diode detector to supply the radar video signals including clutter at a low impedance level, a corresponding plurality of relatively short time constant filter means each electrically connected at the input end thereof to said cathode load to develop a feedback bias delayed in time with respect to said radar video signals by an amount substantially equal to the duration of the pulsed emissions, each of said filter means being electrically connected at the output end thereof to respective suppressor grids of said pentode amplifier stages to supply thereto said feedback bias to automatically control amplifier gain during an interval in which clutter signal is present, thereby preserving incremental gain of the amplifier and precluding saturation of radar video signals during said interval.

References Cited in the file of this patent

UNITED STATES PATENTS

| | | |
| --- | --- | --- |
| 2,162,875 | Bartels | June 20, 1939 |
| 2,241,581 | Boucke | May 13, 1941 |
| 2,329,570 | Wellenstein et al. | Sept. 14, 1943 |
| 2,408,821 | Stearns | Oct. 8, 1946 |
| 2,427,691 | Pritchard | Sept. 23, 1947 |
| 2,440,289 | Pensyl | Apr. 27, 1948 |
| 2,509,077 | Schock | May 23, 1950 |
| 2,526,608 | Loper | Oct. 17, 1950 |
| 2,583,172 | Hargens | Jan. 22, 1952 |
| 2,617,929 | Spindler | Nov. 11, 1952 |
| 2,743,355 | Sink | Apr. 24, 1956 |

UNITED STATES PATENT OFFICE
CERTIFICATE OF CORRECTION

Patent No. 2,910,692                    October 27, 1959

Donald W. MacKiernan

It is hereby certified that error appears in the printed specification of the above numbered patent requiring correction and that the said Letters Patent should read as corrected below.

Column 8, line 19, strike out "divided by the clutter signal,".

Signed and sealed this 8th day of November 1960.

(SEAL)
Attest:

KARL H. AXLINE
Attesting Officer

ROBERT C. WATSON
Commissioner of Patents